(12) United States Patent
Hörberg et al.

(10) Patent No.: US 9,878,462 B2
(45) Date of Patent: Jan. 30, 2018

(54) INTERLEAVING PAPER

(71) Applicant: GEA Food Solutions Germany GmbH, Biedenkopf-Wallau (DE)

(72) Inventors: Winfried Hörberg, Obergünzburg (DE); Alois Bochtler, Egg (DE)

(73) Assignee: GEA FOOD SOLUTIONS GERMANY GMBH, Biedenkopf-Wallau (DE)

( * ) Notice: Subject to any disclaimer, the term of this patent is extended or adjusted under 35 U.S.C. 154(b) by 0 days.

(21) Appl. No.: 15/116,733

(22) PCT Filed: Feb. 10, 2015

(86) PCT No.: PCT/EP2015/052755
§ 371 (c)(1),
(2) Date: Aug. 4, 2016

(87) PCT Pub. No.: WO2015/121251
PCT Pub. Date: Aug. 20, 2015

(65) Prior Publication Data
US 2016/0346951 A1 Dec. 1, 2016

(30) Foreign Application Priority Data
Feb. 12, 2014 (DE) .......... 10 2014 202 525

(51) Int. Cl.
*B26D 7/32* (2006.01)
*B33Y 10/00* (2015.01)
(Continued)

(52) U.S. Cl.
CPC .............. *B26D 7/325* (2013.01); *B26D 1/12* (2013.01); *B26D 7/01* (2013.01); *B29C 39/02* (2013.01);
(Continued)

(58) Field of Classification Search
CPC .... B65B 25/08; B65D 7/325; B65D 2210/02; B26D 7/325; B26D 2210/02
(Continued)

(56) References Cited

U.S. PATENT DOCUMENTS 3,019,578 A * 2/1962 Cohen ............... B26D 7/27
53/157
3,481,746 A * 12/1969 Clemens ............ B26D 7/27
426/420

(Continued)

FOREIGN PATENT DOCUMENTS

DE 8237311 U1 8/1986
DE 19913203 A1 10/1999
DE 19926461 A1 12/2000

OTHER PUBLICATIONS

International Search Report and Written Opinion for Application No. PCT/EP2015/052755, dated Apr. 17, 2015.
International Preliminary Report on Patentability for Application No. PCT/EP2015/052755, dated Apr. 1, 2016.

*Primary Examiner* — Gloria R Weeks
(74) *Attorney, Agent, or Firm* — The Dobrusin Law Firm, P.C.

(57) ABSTRACT

The invention relates to a device for inserting an interleaving paper between a first and a second food slice, or a second and third food slice, a third and fourth food slice, etc., wherein the interleaving paper is guided in a channel and, in a time interval between the slicing of the first food slice and the slicing of the second food slice, exits the channel and enters a slicing region, wherein the channel is designed in such a way that the channel shapes the flat cross-section of the interleaving paper. The invention further relates to a slicing device and an interleaving paper.

20 Claims, 9 Drawing Sheets

(51) Int. Cl.
   *B33Y 80/00* (2015.01)
   *B26D 1/12* (2006.01)
   *B26D 7/01* (2006.01)
   *B29C 39/02* (2006.01)
   *B29C 45/00* (2006.01)
   *B29C 67/00* (2017.01)
   *B26D 1/14* (2006.01)
   *B26D 1/157* (2006.01)
   *B29L 31/28* (2006.01)

(52) U.S. Cl.
   CPC .......... *B29C 45/00* (2013.01); *B29C 67/0051* (2013.01); *B33Y 10/00* (2014.12); *B33Y 80/00* (2014.12); *B26D 1/141* (2013.01); *B26D 1/1575* (2013.01); *B26D 2210/02* (2013.01); *B29L 2031/28* (2013.01)

(58) Field of Classification Search
   USPC .... 53/157, 389.3, 513, 139.5, 520; 493/520, 493/372, 340
   See application file for complete search history.

(56) References Cited

U.S. PATENT DOCUMENTS

| | | | | |
|---|---|---|---|---|
| 3,772,040 | A * | 11/1973 | Benson | B65B 25/08 426/420 |
| 3,991,168 | A * | 11/1976 | Richards | B65B 25/08 426/119 |
| 4,534,548 | A * | 8/1985 | Hanau | B26D 3/28 270/58.33 |
| 4,852,441 | A * | 8/1989 | Anders | B26D 1/29 83/155 |
| 5,001,956 | A * | 3/1991 | Nitsch | B26F 1/0015 493/238 |
| 5,051,268 | A * | 9/1991 | Mally | B26D 7/32 198/462.2 |
| 5,232,430 | A * | 8/1993 | Nitsch | B26D 7/27 383/35 |
| 5,724,874 | A * | 3/1998 | Lindee | B26D 1/0006 83/102 |
| 6,752,056 | B1 | 6/2004 | Weber | |
| 9,399,531 | B2 * | 7/2016 | Pryor | B26D 7/27 |
| 2012/0073249 | A1 * | 3/2012 | Pryor | B26D 7/325 53/514 |
| 2015/0053057 | A1 * | 2/2015 | Dreier | B26D 7/325 83/42 |

* cited by examiner

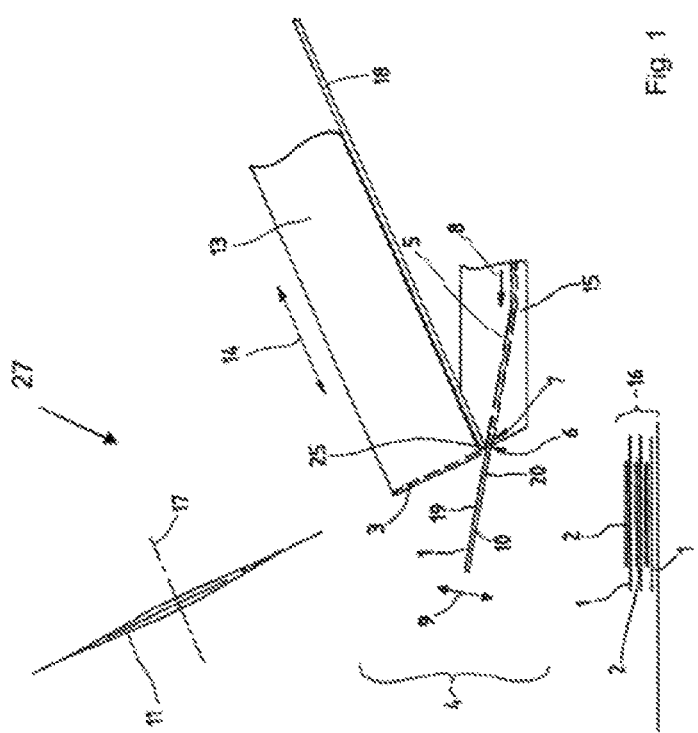

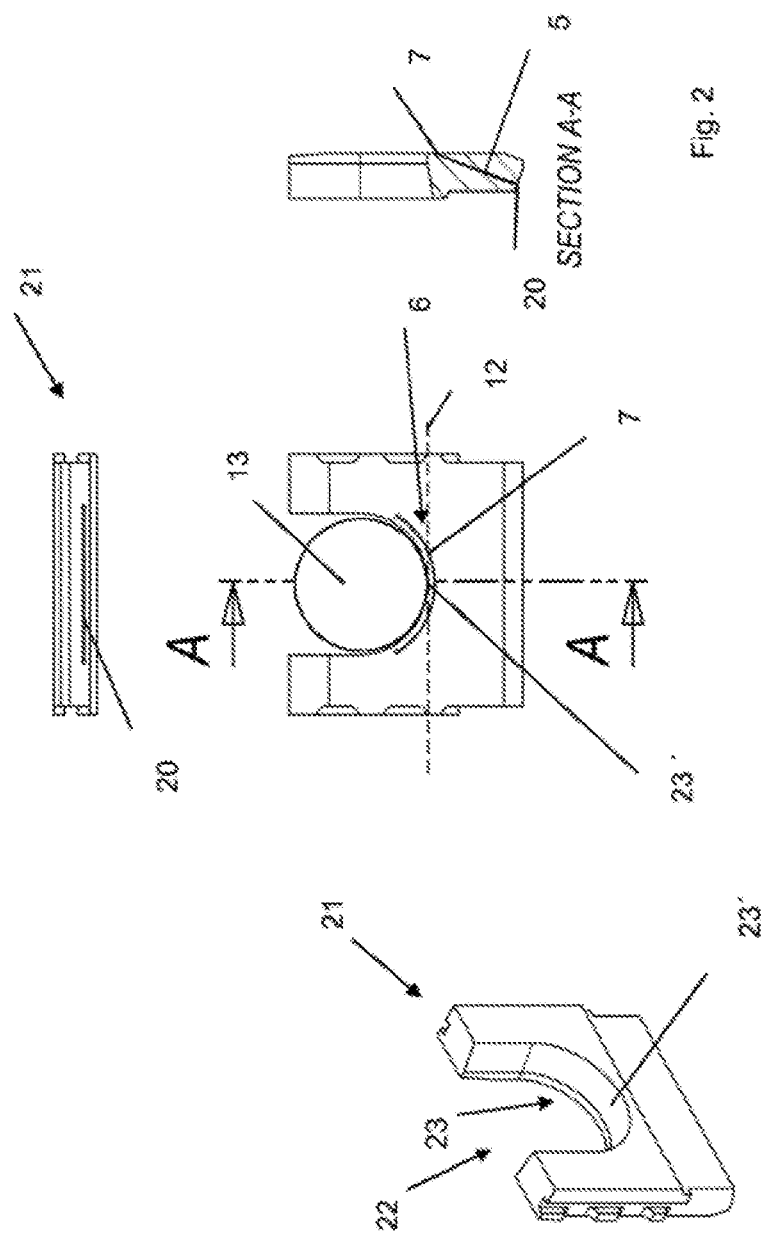

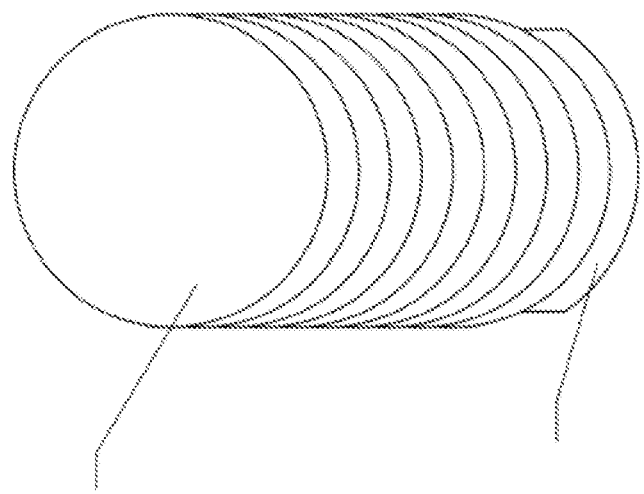
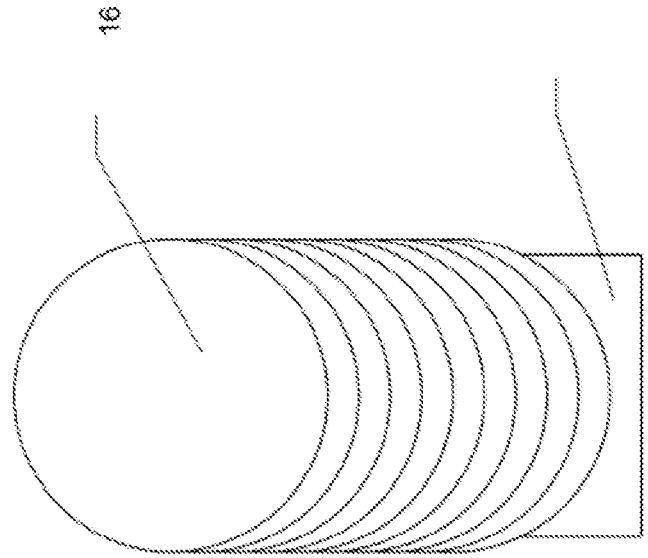

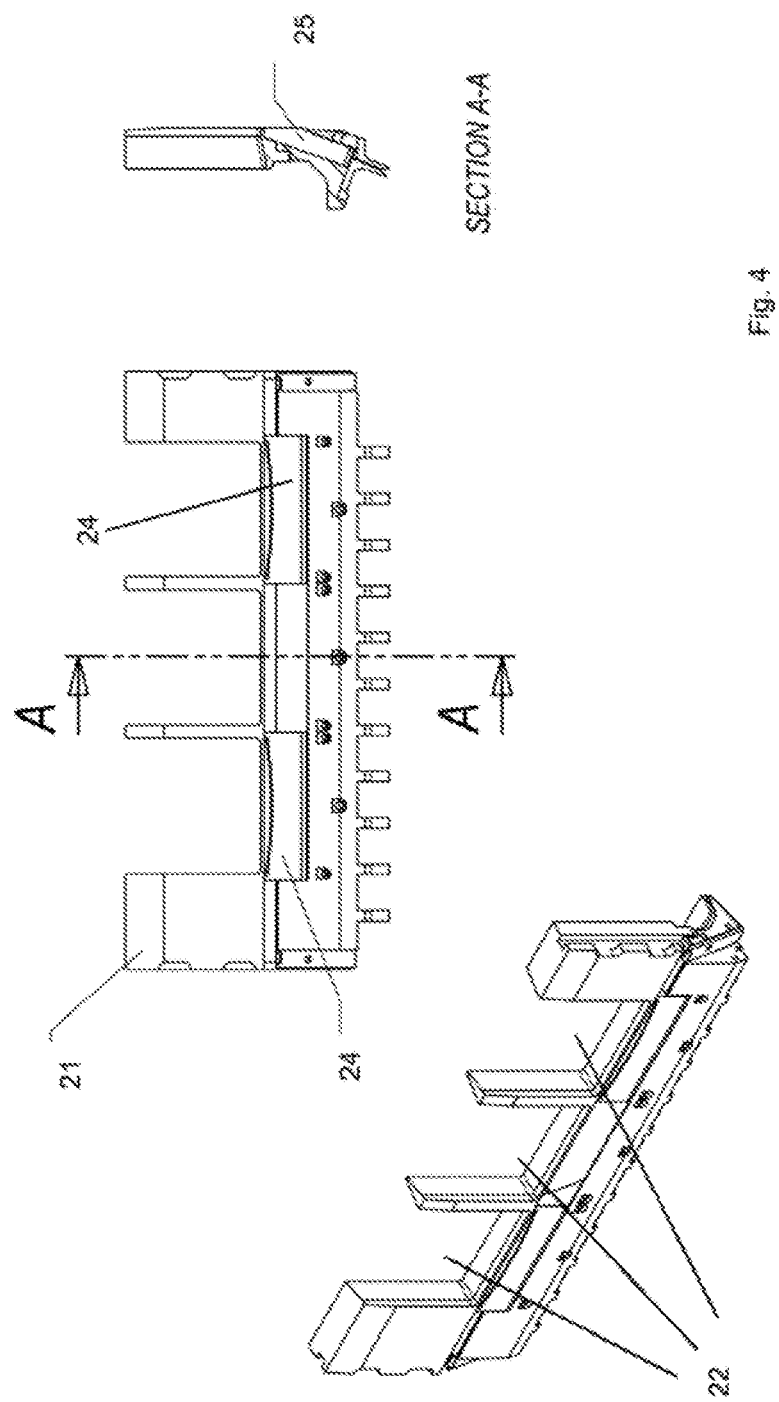

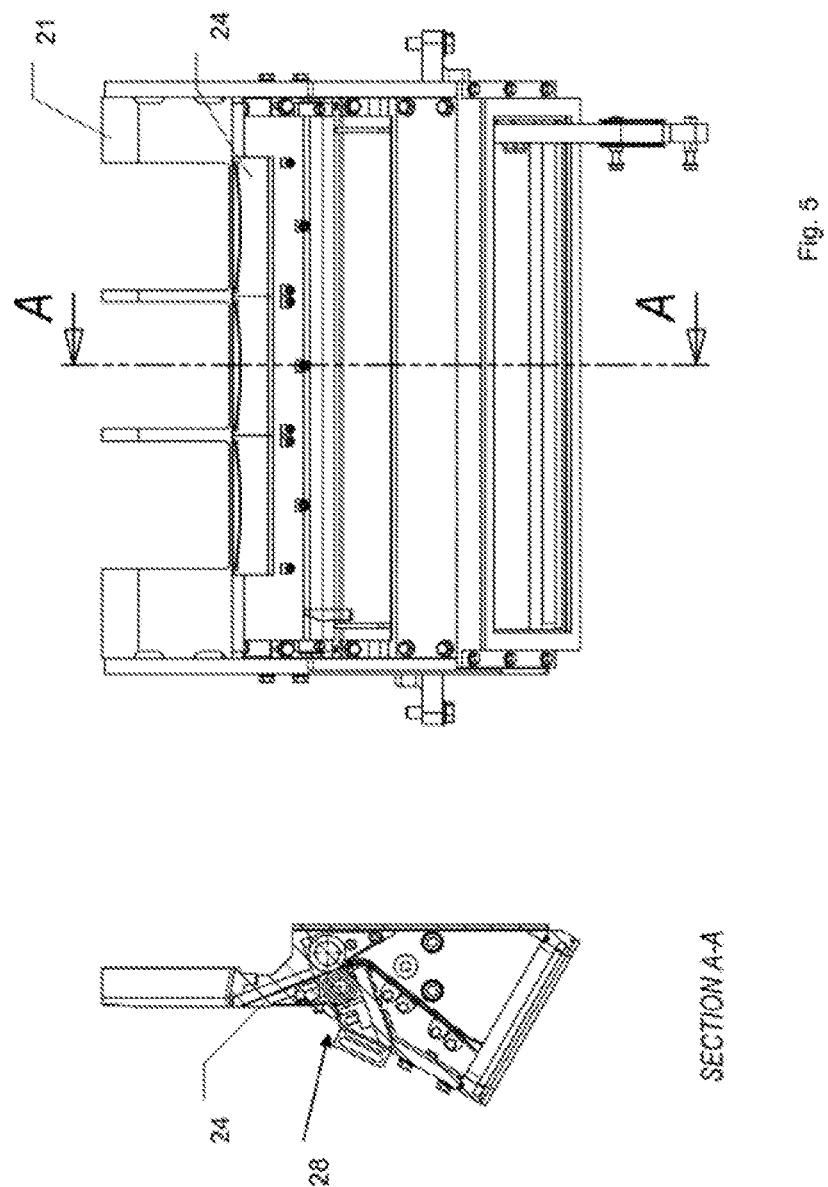

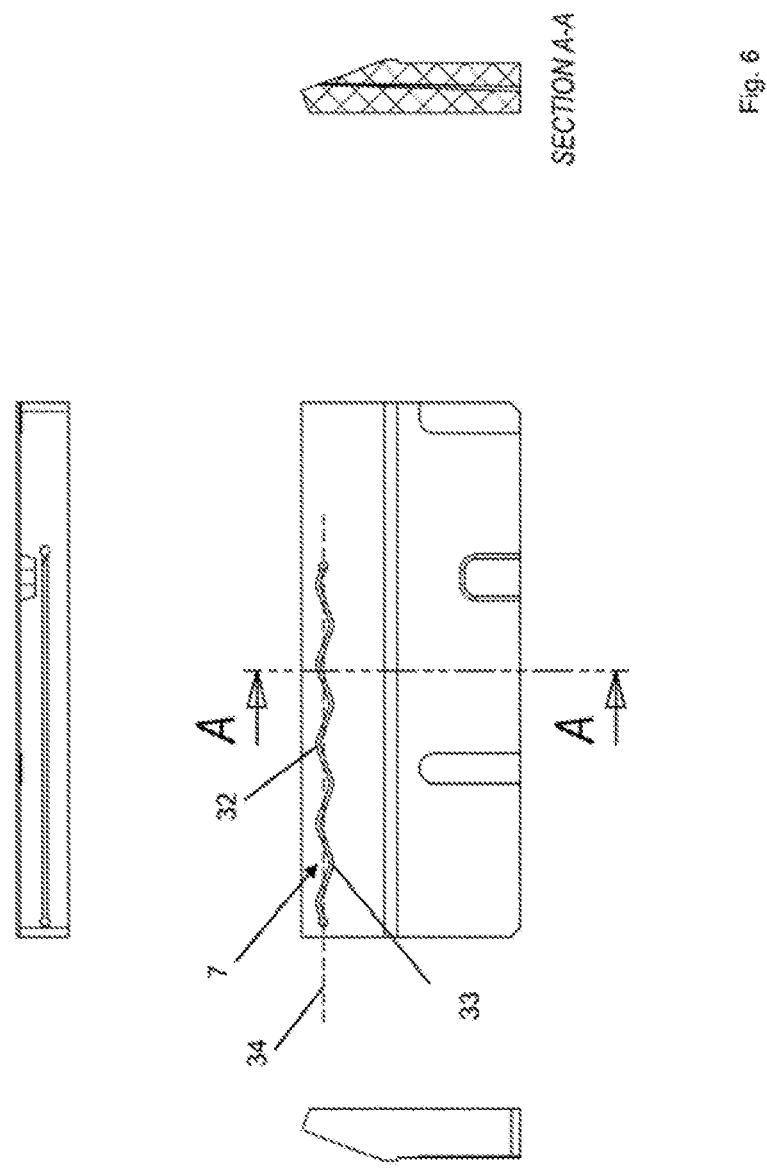

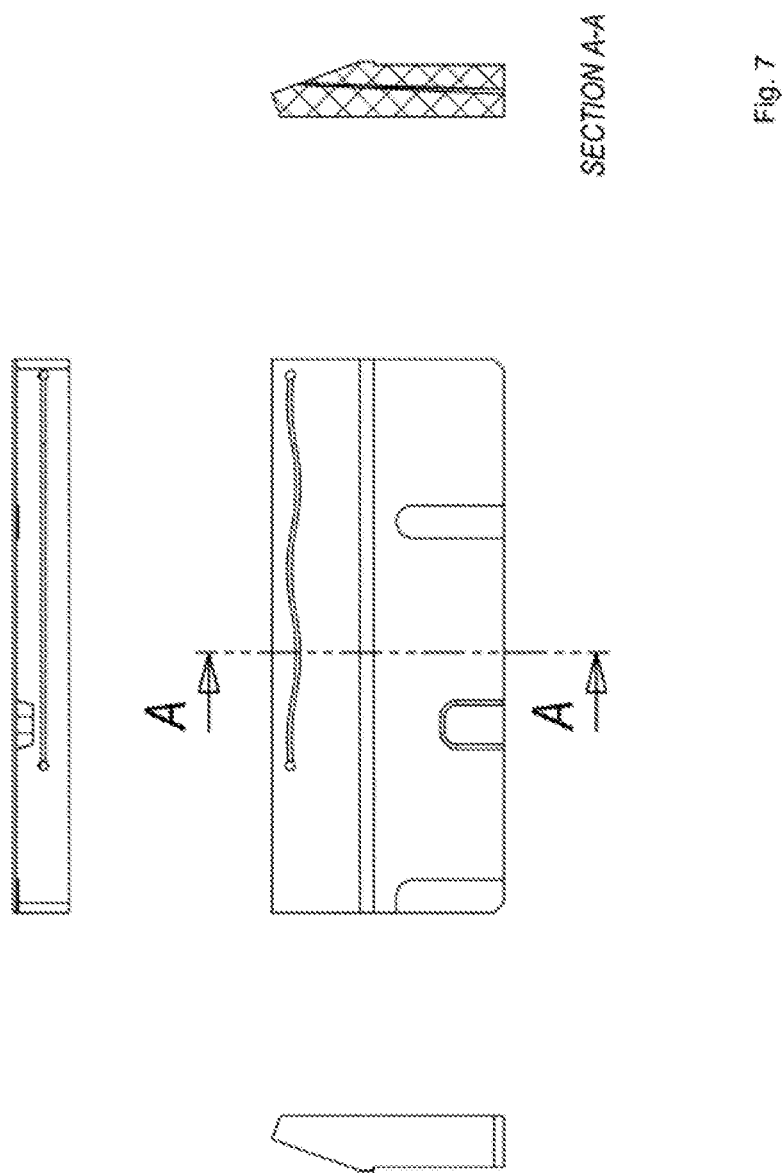

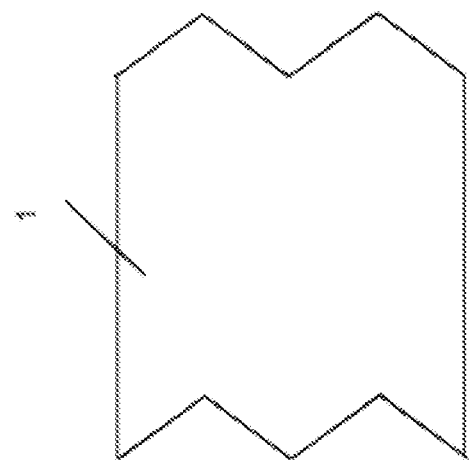
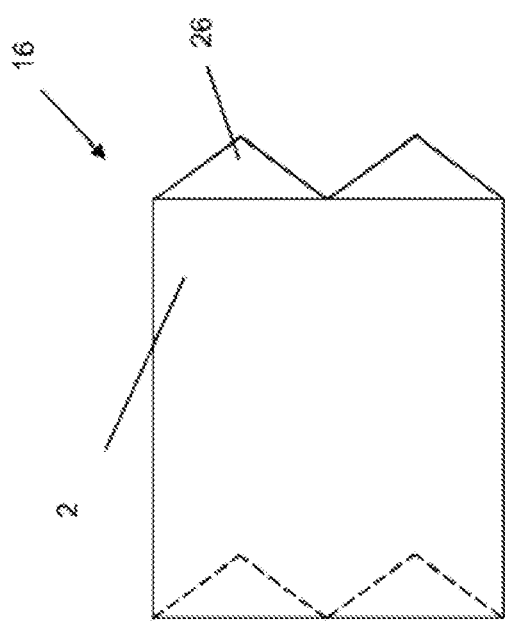
Fig. 8

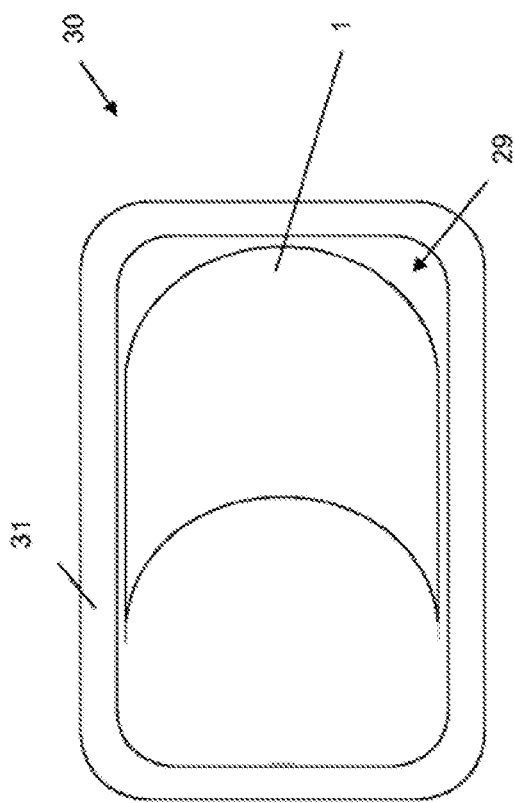

INTERLEAVING PAPER

The present invention relates to a device for inserting an interleaving paper between a first and a second food slice or a second and third, third and fourth food slice, etc, wherein the interleaving paper is guided in a channel and, in a time interval between the slicing of the first food slice and the slicing of the second food slice, exits the channel and enters a slicing region, wherein the channel is provided in such a way that it shapes the originally flat cross section of the interleaving paper. Furthermore, the invention relates to a slicing device and an interleaving paper.

Such devices for inserting an interleaving paper are known from the prior art, for example from DE 199 13 203. However, the device described there has the disadvantage that it is comparatively complicated to manufacture, that the interleaving paper must be comparatively thick and/or that it is comparatively difficult to assemble.

It was therefore the object of the present invention, to provide a device which does not have the disadvantages of the prior art.

The object is achieved with a device for inserting an interleaving paper between a first and a second food slice or between a second and third, third and fourth food slice, etc, wherein the interleaving paper is guided in a channel and, in a time interval, between the slicing of the first food slice and the slicing of the second food slice, exits the channel and enters a slicing region, wherein the channel is provided in such a way that it shapes the originally flat cross section of the interleaving paper, and at least the channel is provided in one piece.

The explanations given in relation to this subject of the present invention apply equally to the other subjects of the present invention and vice versa. The features of this subject of the present indention can be combined with the features of the other subjects of the present invention.

The present invention relates to a device for inserting an interleaving paper between a first and a second food slice or a second and third, third and fourth food slice, etc. Such a food slice is, for example, a cheese, sausage or ham slice. The interleaving paper can be a coated, in particular waxed, paper or else a film, in particular a plastic film. According to the invention, the interleaving paper is guided in a channel and, in the time interval between the slicing of the first and second food slice, is introduced from the channel into the slicing region, in particular shot in. Since, for the insertion of the interleaving paper between two food slices in high-performance slicing devices, which slice up to 1000 or more food slices per minute, only very little time is available and, in addition, the cutting knife also produces a considerable air stream, it is advantageous if the flat cross section of the interleaving paper is shaped in such a way that it has at least one inward and/or outward bulge, i.e. deviates from its originally generally flat shape. As a result, the interleaving paper is stabilized and can consequently be designed to be thinner, for example, and/or shot more quickly into the slicing region.

Each inward and/or outward bulge preferably extends parallel to the insertion direction of the interleaving paper. The deformation is preferably reversible, i.e. after exiting from the channel, the interleaving paper is shaped back into its originally flat shape. The interleaving paper can be shaped in such a way that only its edge region is shaped. Alternatively, however, the entire cross section of the interleaving paper can also be shaped. The interleaving paper can be shaped in the form of a circular segment or elliptical segment or have a plurality of peaks and/or valleys. It is preferable for the edge region of the interleaving paper to be shaped.

According to the invention, at least the channel is now provided in one piece. As a result, the channel can be provided substantially more precisely than was possible in the devices according to the prior art. The channel has no connecting points which have to be centered, in relation to one another and/or at which the interleaving paper can be caught. Furthermore, the height of the cross section of the channel, i.e. the dimension by which the channel is higher than the thickness of the interleaving paper, can be reduced. In addition, the thickness of the interleaving paper can be reduced. Preferably, the thickness of the interleaving paper is 30-75 g/m$^2$, in the case of the interleaving film 30-75 μm, and/or the height of the channel is 0.1 mm-0.2 mm.

For example, the device, in particular the channel, is produced by means of a so-called rapid prototyping method or by casting or by injection molding. A preferred embodiment of the production of the channel is a 3-D printing method. The channel can be produced from steel by wire erosion, in particular as long as there is a straight connection between entry and exit opening. The 3-D printing method has the advantage that it is possible to implement complex shapes in the paper guide.

The guide channel, hitherto always provided in two or More parts, no longer has to be assembled in the Embodiment according to the invention and, since there are no connecting points, the interleaving paper can no longer be caught thereon either.

3-D printing is understood primarily to mean the original-forming fabrication process. 3-D printing is carried out with 3-D printers, which are a specific sub-type of the machine class of digital fabricators. Within the class of digital fabricators, the 3-D printers belong to the partial class of additive, that is to say accumulative, constructing fabricators.

The preferred techniques of 3-D printing are selective laser fusing and electron bears fusing for metals, and selective laser sintering for polymers, ceramics and metals, stereolithography and digital light processing for liquid synthetic resins, and polyjet modeling and fused deposition modeling for plastics and to some extent synthetic resins.

The resolution of a synthetic resin printer is preferably 0.01-0.07 mm in the X and Y direction and 0.005 and 0.025 mm on the Z axis.

3-D printing machines preferably operate only with one material or one material mixture and one printing method. However, it is also preferred to print a plurality of materials simultaneously or sequentially.

For example, the printing of plastics in different levels of hardness and/or colors can be carried out sequentially or simultaneously.

Preferably, not only the channel but the entire cutting bar is provided in one piece. Alternatively, the channel is provided as a module which can be fixed to the cutting bar. The cutting bar preferably has a pocket which receives the module.

The channel is preferably made from plastic material, metal and/or ceramic. All these materials can be used in 3-D printing.

A further innovative or preferred subject of the present invention is a device for inserting an interleaving paper between a first and a second food slice, in which the channel with which the interleaving paper is introduced into the slicing region has a channel end from which the interleaving paper exits, wherein the food slices are cut from a product to be sliced, which is guided in a guide having a product support, wherein, in relation to the vertical, the channel end is provided in some sections above the lowest point of the product support.

The shaping of the interleaving paper is preferably elastic and not plastic, so that the interleaving paper, for example after it has been cut off by the cutting knife, assumes its original flat shape.

The explanations given in relation to this subject of the present invention apply equally to the other subjects of the present invention and vice versa. The features of this subject of the present invention can be combined with the features of the other subjects of the present invention.

The guide for the produce, which in particular is a so-called food bar, is, for example, a so-called spectacle frame which, as a rule, is part of a cutting bar through which the product, is guided in the direction of the cutting knife. The guide encloses the product on at least two, preferably 3, sides. The product to be sliced is transported through the guide in the direction of a cutting knife, which severs food slices from the front end of the product. This guide acts additionally and, according to a preferred embodiment, of the present invention, simultaneously as a cutting bar which, when cutting off a food slice, interacts with the cutting knife and, as a result, ensures that the respective food slice is out off exactly. The cutting bar, together with the cutting knife, defines a cutting plane in which the respective food slice is severed from the product. Between the cutting bar and the plane in which the cutting knife rotates there is a so-called cutting gap, although this should be as small as possible in order to avoid whisker formation on the respective food slice or hacking instead of cutting.

The channel end can, for example, be provided with a plurality of elevations and depressions, for example serrated and/or corrugated. According to another preferred embodiment, the channel end is implemented in the form of a circular segment, or elliptical segment. At least one end of the interleaving paper, which extends parallel to its direction of motion in the channel, is preferably curved in the direction of the guidance of the product. This also applies to the case in which, in relation to the vertical, the channel end is not provided in some sections above the lowest point of the product support.

The channel end is preferably provided so as to be parallel to the contour of the product support, at least in some sections.

Preferably, the channel is fitted reversibly to the cutting bar, in particular as a replaceable module, and can thus easily be replaced. This makes it possible to provide different channels easily and simply for different interleaving papers. In the event, of a product change, the interleaving paper or the channel in which the latter is shaped can easily be replaced together without the cutting bar having to be disassembled. The replaceable modules are preferably plugged into pockets of the interleaver, the cutting bar preferably being raised for this purpose. The replaceable modules are plugged into the pockets of the interleaver; the cutting bar has to be raised for this purpose.

According to a further preferred or innovative subject of the present invention, the channel is shaped in such a way that the interleaving paper has a grip tab.

The explanations given in relation to this subject of the present invention apply equally to the other subjects of the present invention and vice versa. The features of this subject of the present invention can be combined with the features of the other subjects of the present invention.

Reference can substantially be made to the explanations given above.

According to the invention, the channel end of the channel is provided such that the interleaving paper is shaped by the channel in such a way that, after being cut off and when it has assumed a flat shape again, said interleaving paper has a grip tab which can be gripped by two or more fingers of a user. As a result, the removal of individual food slices, for example from a pack or a stack, is made easier. The grip tab is preferably located at the end of the interleaving paper which extends at right angles to its direction of motion.

A still further innovative or preferred subject of the present invention is a device in which the channel, in particular the channel end, is shaped such that the interleaving paper has at least one, preferably two, flattened corners.

The explanations given in relation to this subject of the present invention apply equally to the other subjects of the present invention and vice versa. The features of this subject of the present invention can be combined with the features of the other subjects of the present invention.

Reference can substantially be made to the explanations given above.

According to the invention, the channel is provided such that the interleaving paper is shaped therein such that, following the severing from the endless strip and after the interleaving paper has attained a flat shape again, at least one, preferably two, corners, in particular two opposite corners, of the interleaving paper are flattened. This innovative or preferred embodiment of the present invention has the advantage, that the interleaving paper seldom gets into the sealing plane of a pack in which a food slice portion with the interleaving papers located in between is placed, so that fewer packs with inadequate sealing are produced or, for the same product, a smaller pack with, less empty space around the product can be produced.

A still further subject of the present invention is a slicing device having a cutting knife which cuts food slices from the front end of the product, wherein an interleaving paper is provided between two slices, exits from a channel and is severed by the cutting knife. According to the invention, the slicing device has the innovative device for inserting an interleaving paper into the slicing region.

The explanations given in relation to this subject of the present invention apply equally to the other subjects of the present invention, and vice versa. The features of this subject of the present invention can be combined, with the features of the other subjects of the present invention.

The slicing device, even in the case of relatively long interleaving papers, has no further guide and/or support, such as an air stream, apart from the channel, which prevents the paper buckling during insertion, into the slicing region. As a result, the slicing device according to the invention is more hygienic and has lower operating costs.

Alternatively or additionally, a thinner interleaving paper than in the prior art can be used. In addition to the saving in materials, this has the advantage that the interleaving paper rolls are lighter or have to be changed less frequently.

The slicing device preferably has a cutting bar which is provided in a pocket, in which the channel from which the interleaving paper is shot out can be provided replaceable.

A still further subject of the present invention is an interleaving paper which is provided under a food slice and/or between two food slices and which has a grip tab.

The explanations given in relation to this subject of the present invention apply equally to the other subjects of the present invention and vice versa. The features of this subject of the present invention can be combined with the features of the other subjects of the present invention.

A still further preferred or innovative subject of the present invention is an interleaving paper which is provided under a food slice and/or between two food slices and which has at least one, preferably two, flattened corners.

The explanations given in relation to this subject of the present invention apply equally to the other subjects of the present invention and vice versa. The features of this subject of the present invention can be combined with the features of the other subjects of the present invention.

A further subject of the present invention is a method for producing a device according to the invention for inserting an interleaving paper between a first and a second food slice or a second and third, third and fourth food slice, etc, wherein the interleaving paper is guided in a channel and, in a time interval between the slicing of the first food slice and the slicing of the second food slice, exits the channel and enters a slicing region (4), in which at least the channel is produced in one piece by casting, injection molding, wire erosion and/or by a 3-D printing method.

The explanations given in relation to this subject of the present invention apply equally to the other subjects of the present invention and vice versa. The features of this subject of the present invention can be combined with the features of the other subjects of the present invention.

According to the invention, the channel is produced from one piece and is no longer assembled from a plurality of pieces, as in the prior art. Consequently, no connecting joins occur and it is not necessary for any parts of the channel to be aligned relative to one another.

The invention will be explained below by using the FIGS. 1-9.

These explanations are purely exemplary and do not restrict the general idea of the invention. The explanations apply equally to all the subjects of the present invention.

FIG. 1 shows the slicing device according to the invention.

FIG. 2 shows a first embodiment of the device according to the invention for inserting an interleaving paper into the slicing region of the slicing device.

FIG. 3a shows a food portion according to the prior art.

FIG. 3b shows a food portion with an interleaving paper according to the invention.

FIGS. 4-5 show a further embodiment of the device according to the invention for inserting an interleaving paper into the slicing region of the slicing device.

FIGS. 6-7 each show an embodiment of the channel end of the device according to the invention.

FIG. 8 shows the interleaving paper according to the invention.

FIG. 9 shows a pack having an interleaving paper.

FIG. 1 shows a slicing device 27 according to the invention. This slicing device has a cutting knife 11, which preferably rotates about an axis 17 and severs food slices 2, 3 from the front end of the product 13, for example a sausage, cheese or ham bar. The product 13, here a food bar, is transported along a support 18 in the direction of the cutting knife, as illustrated by the arrow 14. For a so-called empty cut, the product can be drawn back from the cutting knife and/or the cutting knife can be moved away from the front end of the product. The transport path of the product between two cuts of the cutting knife 11 determines the thickness of the respective food slice. A cutting bar 21, which interacts with a cutting knife 11 during the cutting of the food slice, is preferably provided at the end of the support 18. The food slices 2, 3 that are cut off are configured to form a portion 16, here a stack of slices, wherein according to the invention a so-called interleaving paper 1 is respectively provided between two food slices and preferably under the lowest food slice, preventing the food slices 2 from sticking to one another too much. The interleaving paper simplifies the separation of the respective food slices from the portion 16 for the user. The slicing device according to the invention is preferably a so-called high-performance slicer, which severs 200-1000 food slices per minute or more from the product. The time interval which is available for placing the interleaving paper between two food slices is correspondingly small. In addition, the rotating knife generates a considerable air stream, which likewise has to be taken into account when arranging the interleaving paper between two food slices. The interleaving paper 3 is shot into the slicing region 4 by means of the device 15, which is generally located underneath the support 18 of the product 13. As a rule, the interleaving paper is provided on a roll and then transported in the direction of the cutting knife, in order for a certain length 10 to be shot into the slicing region and then severed by the cutting knife 11. In order to insert the interleaving paper 1 into the slicing region 4, the device 15 has a channel, with which the interleaving paper is transported in the direction illustrated by the arrow 8, in order to avoid the interleaving paper behaving in an uncontrolled manner during insertion into the slicing region, in particular buckling, said interleaving paper is shaped by the channel, in particular by the channel end 6 and/or by the opening 7 provided at the channel end 6, in such a way that it is no longer flat but, for example, has an upstanding region deviating from the flat shape and extending parallel to the conveying direction 8. As a result of this profiling 9 of the interleaving paper transversely to its conveying direction 8, the stability of the interleaving paper is increased, so that the latter can be transported more quickly into the slicing region 4 and/or can be provided to be thinner.

FIG. 2 shows a first embodiment of the device according to the invention for inserting an interleaving paper into the slicing region, which here is provided as a so-called cutting bar 21. This cutting bar 21 has a product guide 22 with a product support 23. The product guide 22 guides and/or holds the product 13 during the cutting of a food slice from the front end of the product. At the same time, the cutting bar interacts with the cutting knife, by which means the quality of the respective cut is improved. Underneath the product guide 22, it is possible to see the exit opening 7 of the channel 5, through which the interleaving paper is shot into the slicing region and, in the present case, is configured in the shape of a circular segment, so that the exiting paper will also assume the shape of a circular segment. It can be seen clearly that the opening 7, in relation to the vertical, is provided in some sections, here with the two cuter ends, above the lowest point or the line 23' of the product support 23. By means of this embodiment of the channel 5 and the opening 7 thereof, in addition to the stabilization of the interleaving paper as it is shot in, in addition two opposite corners of the interleaving paper are flattened, rounded here, as illustrated for example in FIG. 3b or in FIG. 9, as soon as the interleaving paper assumes a flat shape again. Furthermore, FIG. 2 illustrates the channel start 20, through which the interleaving paper enters the channel 5, which is preferably configured so as to be flat. The fact that, according to a preferred or innovative embodiment, the channel is implemented in one piece means that no centering problems result as in the case of a multi-part embodiment of the channel 5. In addition, the transitions from the flat entry region to the exit region from the channel in the form of a circular segment can be configured, continuously, which means that jamming of the interleaving paper is at least reduced. In the present case, the entire cutting bar 21 is implemented in one piece and preferably produced in accordance with a so-called rapid prototyping method, in which particulate plastic parts are printed by a 3-D printer onto a supporting surface and there, under the action of pressure and/or temperature and/or radiation and/or a solvent, are connected to the remaining particles to form a one-piece component. However, those skilled in the art will see that, it is also possible to use other production methods with, which at least the channel 5, preferably the entire cutting bar 21, can be produced in one piece.

FIG. 3a shows a portion 16 having an interleaving paper 1 according to the prior art. This interleaving paper has a straight cut at its front end, so that, the two opposite corners of the interleaving paper 1 project relatively far out of the portion. This disadvantage is avoided in the embodiment according to FIG. 3b, in which the two opposite corners have been flattened, rounded here. In particular, the front section of the interleaving paper illustrated in the embodiment according to FIG. 3b is illustrated in the shape of a circular segment. By means of the flattening of the corners, as will be explained in particular by using FIG. 9, the interleaving paper is prevented from getting into the sealing region of the pack into which the portion is packed. Although only one interleaving paper is illustrated, those skilled in the art will see that interleaving papers are preferably arranged between each two food slices.

FIG. 4 shows a further embodiment of the present invention. In the present case, a cutting bar 21 is provided which has a plurality of product guides 22, three here, so that here three products can be cut exit in parallel with one another. Underneath the respective product guide 22 there is in each case an interleaving paper guide module 24, in which the channel 5 frost which the interleaving paper is shot into the slicing region is provided. As can be seen in particular by using the section A-A, the interleaving paper guide module is preferably arranged in a holder 25 of the cutting bar, which accommodates the module 24 reversibly, i.e. replaceably. In the central illustration, underneath the right-hand and left-hand product guides 22, a guide module 34 is respectively provided, whereas in the central module, this has been left out to make it easier to see. The holders are preferably each implemented as pockets, into which the respective module can respectively be inserted and fixed there. The pocket preferably has guide means for the guide module, so that the latter can be fixed within the pocket in a clearly defined position.

FIG. 5 shows further details of the insertion of the interleaving paper into the slicing region. The interleaving paper is inserted into the channel by means of the drive, here two rollers 28, here into the channel of the interleaving paper guide module, and is shot from the latter into the slicing region.

FIGS. 6 and 7 each show a possible shape of the opening 7 of the channel end 6. In the embodiment according to FIG. 6 this opening is serrated, that is to say it has a plurality of serrated elevations 12 and depressions 33 which here project on both aides irons an imaginary flat shape 34 of the interleaving paper. In the embodiment according to FIG. 7, reference can be made substantially to the explanations according to FIG. 6, the elevations and depressions here being configured in the shape of corrugations or circular segments.

FIG. 8 shows an embodiment of the interleaving paper 1 according to the invention, wherein the left-hand illustration shows a portion 16 having the interleaving paper 1 and the right-hand illustration shows only the interleaving paper 1. By using the left-hand illustration, if is possible to see clearly that here two grip tabs 26 which, in the present case are provided in the form of rectangles, project from the food slices. These grip tabs 26 can be gripped by two or more fingers of a user, by which means they can simply be gripped jointly or independently of a food slice 2 located thereon and can be pulled off. The shape of the grip tab 26 can be predefined by the shape of the opening 7 of the channel 5. For the production of the present interleaving paper, the opening is serrated.

FIG. 9 shows an interleaving paper 1 in a packaging tray 30. The fact that the corners of the interleaving paper 1 have been flattened, rounded here, means that there is no danger that these will project into the sealing plane 31 in which the packaging tray is connected to a covering film. Such an interleaving paper can be produced with an opening 7 as illustrated in FIG. 2.

LIST OF DESIGNATIONS

1 Interleaving paper
2 Food slice cut off
3 Food slice to be cut off
4 Slicing region
5 Channel
6 Channel end
7 Opening
8 Conveying direction of the interleaving paper
9 Profiling transverse to the conveying direction
10 Section shot out
11 Cutting knife
12 Plane through the lowest point of the support
13 Product, food bar
14 Direction of motion of the food bar
15 Device for shooting the interleaving paper in
16 Portion comprising a plurality of food slices
17 Axis of rotation of the cutting knife
18 Support for the food bar
19 Upstanding region of the interleaving paper
20 Channel start
21 Cutting bar
22 Product guide
23 Product support
23' Lowest point/line of the product support
24 Interleaving paper guide module
25 Holder for interleaving paper guide module
26 Grip tab
27 Slicing device
28 Drive for the interleaving paper, roller(s)
29 Flattened, rounded corner
30 Packaging tray
31 Sealing plane
32 Elevation
33 Depression
34 Flat shape

The invention claimed is:
1. A slicing device comprising:
a cutting knife that cuts food slices from a front end of a product,
a device for inserting an interleaving paper between a first food slice and a second food slice, and
a channel in which the interleaving paper is guided,
wherein in a time interval between slicing of the first food slice and the second food slice, the interleaving paper exits the channel and enters a slicing region, wherein the channel shapes a flat cross section of the interleaving paper, and wherein at least the channel is provided in one piece, and the channel is fitted reversibly to a cutting bar.

2. The slicing device as claimed in claim 1, wherein at least a region in which the channel is provided is 3D-printed.

3. The slicing device as claimed in claim 1, wherein the channel has a channel end from which the interleaving paper exits, wherein the first food slice and the second food slice are cut from the product that is guided in a guide having a product support, and wherein, in relation to a vertical, the channel end is provided in some sections above a lowest point of the product support.

4. The slicing device as claimed in claim 3, wherein the channel end is provided parallel to the product support, at least in some sections.

5. The slicing device as claimed in claim 1, wherein the channel is arranged in a pocket of the cutting bar.

6. The slicing device as claimed in claim 1, wherein the channel is provided as a module that is reversibly received in a pocket of the cutting bar so that the module can be replaced so that different channels can be provided for different interleaving papers, wherein the cutting bar comprises a product guide that guides and/or holds the product, and wherein the channel is located below the product guide.

7. The slicing device as claimed in claim 1, wherein the channel comprises a channel end from which the interleaving paper exits, and wherein the channel end has a plurality of elevations and depressions forming a serrated opening that is adapted to shape the flat cross section of the interleaving paper when the interleaving paper exits the channel end.

8. The slicing device as claimed in claim 7, wherein the cutting bar comprises a plurality of product guides so that more than one of the product is cut in parallel, and the channel in which the interleaving paper is guided is provided below each of the product guides.

9. The slicing device as claimed in claim 1, wherein the channel comprises a channel end from which the interleaving paper exits, and wherein the channel end comprises a circular segment that is adapted to shape the flat cross section of the interleaving paper into a circular segment shape when the interleaving paper exits the channel end.

10. The slicing device as claimed in claim 9, wherein the cutting bar comprises a plurality of product guides so that more than one of the product is cut in parallel, and the channel in which the interleaving paper is guided is provided below each of the product guides.

11. The slicing device as claimed in claim 1, wherein the slicing device comprises a product guide that guides and/or holds the product, and the channel is provided below the product guide and the product.

12. A slicing device comprising:
a cutting knife adapted to sever food slices from a food product;
a cutting bar comprising a product guide for guiding the food product; and
a channel that is located below the product guide, the channel comprises a channel end that is adapted to shape an interleaving paper so that a cross section of the interleaving paper is no longer flat when the interleaving paper exits the channel end, wherein the channel is produced in one piece, and wherein the channel is provided as a module that is reversibly received in a pocket of the cutting bar so that the module can be replaced so that different channels can be provided for different interleaving papers.

13. The slicing device as claimed in claim 12, wherein the channel end has a plurality of elevations and depressions forming a serrated opening that is adapted to shape the flat cross section of the interleaving paper when the interleaving paper exits the channel end.

14. The slicing device as claimed in claim 13, wherein the cutting bar comprises a plurality of product guides so that more than one of the product are cut in parallel, and the channel in which the interleaving paper is guided is provided below each of the product guides.

15. The slicing device as claimed in claim 12, wherein the channel end comprises a circular segment or an elliptical segment that is adapted to shape the flat cross section of the interleaving paper into a circular segment shape when the interleaving paper exits the channel end.

16. The slicing device as claimed in claim 15, wherein the cutting bar comprises a plurality of product guides so that more than one of the product are cut in parallel, and the channel in which the interleaving paper is guided is provided below each of the product guides.

17. A slicing device comprising:
a cutting knife that cuts food slices from a front end of a product;
a device for inserting an interleaving paper between a first food slice and a second food slice, the first food slice and the second food slice are cut from the product that is guided in a guide having a product support; and
a channel in which the interleaving paper is guided, the channel is adapted to shape a flat cross section of the interleaving paper, the channel is provided in one piece, and the channel has a channel end from which the interleaving paper exits, wherein, in relation to a vertical, the channel end is provided in some sections above a lowest point of the product support, wherein the channel end is provided parallel to the product support, at least in some sections, and wherein in a time interval between slicing of the first food slice and the second food slice, the interleaving paper exits the channel end and enters a slicing region.

18. The slicing device as claimed in claim 17, wherein the channel end has a plurality of elevations and depressions forming a serrated opening that is adapted to shape the flat cross section of the interleaving paper when the interleaving paper exits the channel end.

19. The slicing device as claimed in claim 17, wherein the channel end comprises a circular segment that is adapted to shape the flat cross section of the interleaving paper into a circular segment shape when the interleaving paper exits the channel end.

20. The slicing device as claimed in claim 17, wherein the slicing device comprises a cutting bar that comprises a plurality of product guides so that more than one of the product are cut in parallel, and the channel in which the interleaving paper is guided is provided below each of the product guides.

* * * * *